United States Patent [19]

Saegusa

[11] Patent Number: 4,601,567
[45] Date of Patent: Jul. 22, 1986

[54] EXPOSURE CONTROL APPARATUS FOR CAMERA

[75] Inventor: Takashi Saegusa, Kawasaki, Japan

[73] Assignee: Nippon Kogaku K. K., Tokyo, Japan

[21] Appl. No.: 651,344

[22] Filed: Sep. 17, 1984

[30] Foreign Application Priority Data

Sep. 20, 1983 [JP] Japan ................... 58-173663

[51] Int. Cl.$^4$ .............................................. G03B 7/08
[52] U.S. Cl. .................................................. 354/443
[58] Field of Search ................... 354/441-464

[56] References Cited

U.S. PATENT DOCUMENTS

| 4,146,317 | 3/1979 | Date et al. ........................... 354/442 |
| 4,264,159 | 4/1981 | Ueda et al. ...................... 354/442 X |
| 4,290,674 | 9/1981 | Kobori et al. ........................ 354/442 |
| 4,307,948 | 12/1981 | Kitamura et al. .................... 354/448 |
| 4,477,161 | 10/1984 | Kawasaki et al. ................... 354/448 |

Primary Examiner—William B. Perkey
Attorney, Agent, or Firm—Shapiro and Shapiro

[57] ABSTRACT

An exposure control apparatus for a camera of light intensity feedback metering system calculates an aperture to be closed, generates a correction value in accordance with a calculation result, and determines an exposure in accordance with the correction value.

14 Claims, 17 Drawing Figures

EXPOSURE CONTROL APPARATUS FOR CAMERA

BACKGROUND OF THE INVENTION

1. Field of the Invention

The present invention relates to a camera of light intensity feedback metering system used in an automatic exposure control apparatus and the like and, more particularly, to an apparatus for correcting an exposure error which is caused by a metering optical system.

2. Description of the Prior Art

The TTL metering system for automatic exposure is roughly classified into the full-aperture metering system and the light intensity feedback metering system. Recently, in order to realize a multimode camera, control according to the TTL light intensity feedback metering system is performed wherein the indication within the viewfinder is performed by full-aperture metering, and another metering is performed after the stop is closed immediately after the shutter release button is depressed so as to perform aperture control or shutter control. The TTL light intensity feedback metering system is one type of light intensity feedback metering system. When exposure control is performed in accordance with one of these TTL metering systems, a photocurrent of a metering circuit and the illuminance on the film surface must have a linear relationship. However, an image is directly formed on the film surface by a photographic lens, while an image is formed on a light-receiving element with light received through a photographic lens, a screen, a condenser lens, a pentaprism, and an optical system for forming an image on the light-receiving element. For this reason, the linear relationship between the metering photocurrent and the film surface illuminance is difficult to obtain.

SUMMARY OF THE INVENTION

It is an object to provide an exposure control apparatus for a camera, which can perform a suitable correction in TTL metering of the camera and can thereby reduce an exposure error.

The exposure control apparatus for a camera of light intensity feedback metering system according to the present invention calculates an aperture to be closed, generates a correction value in accordance with a calculation result, and determines an exposure in accordance with the correction value.

DETAILED DESCRIPTION OF THE PREFERRED EMBODIMENTS

Figure 1:
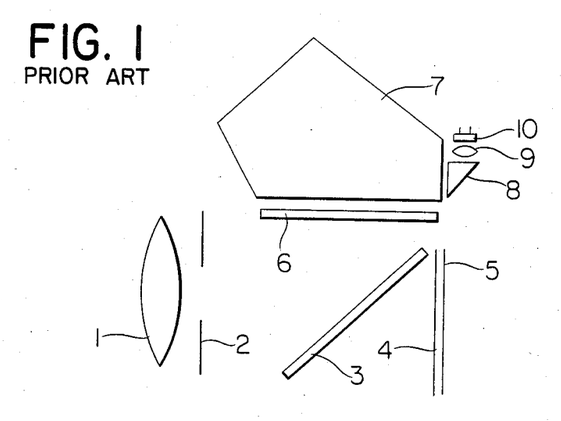
FIG. 1 is a view of a metering optical system.

FIG. 1 is a schematic view showing an example of a metering optical system for a single lens reflex camera, to which the present invention may be applied. A single reflect camera according to the present invention includes a photographic lens 1, a stop 2, a quick return mirror 3, a shutter 4, a finder screen 6, a pentaprism 7, a triangular prism 8, a converging lens 9, and a metering light-receiving element 10. A film surface 5 is arranged behind the shutter 4. A set of the members 8, 9 and 10 is arranged at each side of an eyepiece (not shown). In this apparatus, a condenser lens is omitted. When a photograph is taken, the quick return mirror 3 is moved upward and the shutter 4 is opened. Then, light from an object to be photographed reaches the film surface 5 through the lens 1 and the stop 2. However, in the metering operation, the light from the object to be photographed reaches the light-receiving element 10 through the lens 1, the stop 2, the mirror 3, the screen 6, the pentaprism 7, the triangular prism 8, and the converging lens 9. In this manner, in the metering operation, since the light propagates through a larger number of optical elements, when metering is performed with a closed stop, the relationship between the output from the light-receiving element and the illuminance on the film surface, that is, the linearity therebetween has an error.

Figure 2:
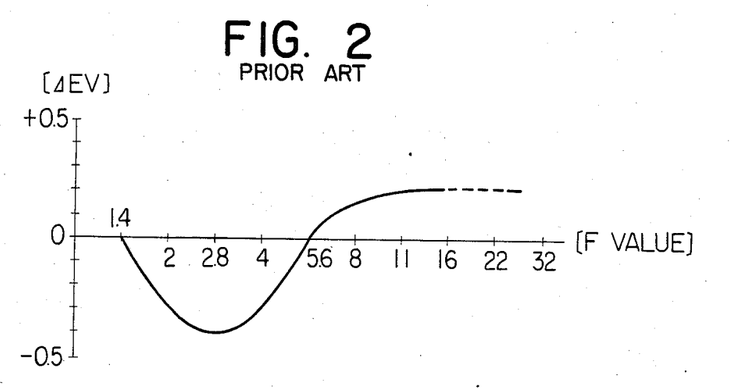
FIG. 2 is a graph showing a control error caused due to the presence of the metering optical system.

FIG. 2 is a graph showing an exposure error when the stop and the shutter are respectively controlled to an aperture and a shutter speed to provide an optimal exposure in the light intensity feedback metering with a camera having the metering system shown in FIG. 1. It is seen from FIG. 2 that the exposure error changes with changes in the F number or aperture. This is attributed to the fact that the metering output which is theoretically assumed to provide optimal exposure includes an error which changes with changes in the F number.

Referring to FIG. 2, when the F value or number is F 1.4, there is almost no error. However, as the F number is increased to F 2 and F 2.8, an exposure error of about −0.4 (EV) toward the underexposure side is generated. The exposure error becomes zero at the F number of F 5.6. As the F number increases to F 8 and F 11, an exposure error of 0.2 (EV) toward the overexposure side is generated. These characteristics remain substantially the same when the photographic lens is replaced with another interchangeable lens and are only dependent on the F number at the exposure time. With a lens having an open aperture of F 2 or F 2.8, the error changes within the range from F 2 or F 2.8 to F 22 or F 32 indicated by the dotted line shown in FIG. 2. The reason why the characteristics are determined by aperture irrespective of the type of interchangeable lens may be surmised as follows.

Figure 3:
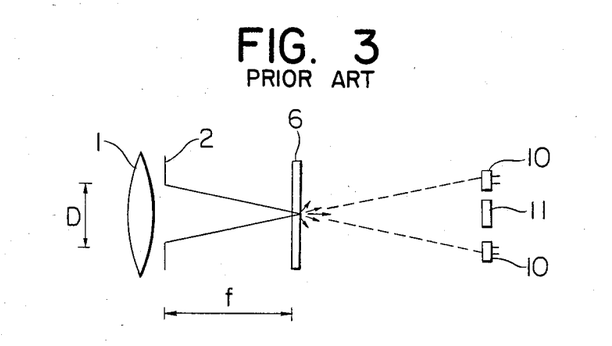
FIG. 3 is a developed view of the metering optical system shown in FIG. 1.

FIG. 3 is a schematic developed view of the metering system shown in FIG. 1. The light-receiving elements 10 are arranged at the two sides of the eyepiece 11. An F number $F_{NO}$ is given by:

$$F_{NO} = f/D$$

where D is the effective diameter and f is the focal length. It is assumed that when the effective diameter D changes, the maximum angle of incidence of light incident on the screen 6 changes, and the characteristics of the diffused light from the screen 6 are changed. It is also assumed that the same applies to the focal length f. Therefore, the F number $F_{NO}$ determines the dispersion property of the screen 6 and also the light influence on the light-receiving elements 10. Accordingly, the characteristics as shown in FIG. 2 are independent of any property of the lens.

Figures 4, 4B:
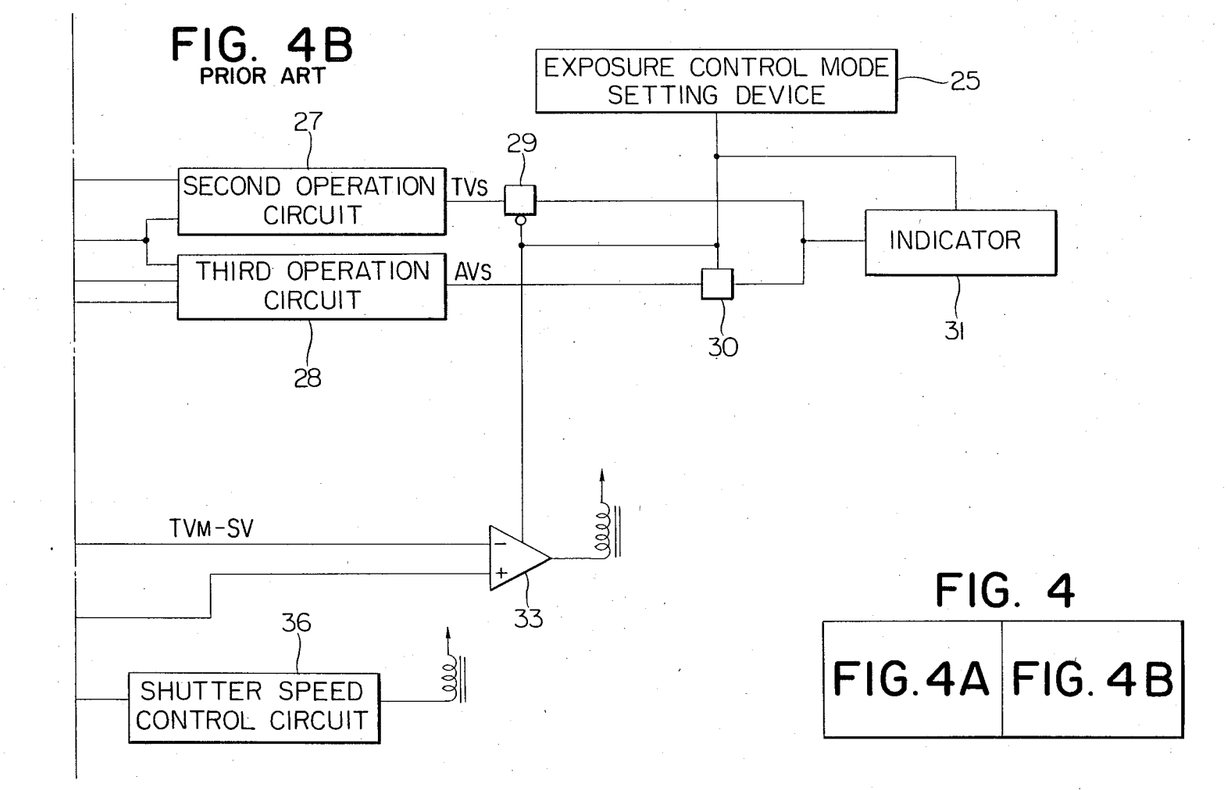
FIG. 4 composed of FIGS. 4A and 4B is a block diagram of a conventional automatic exposure control apparatus.
Figure 4A:
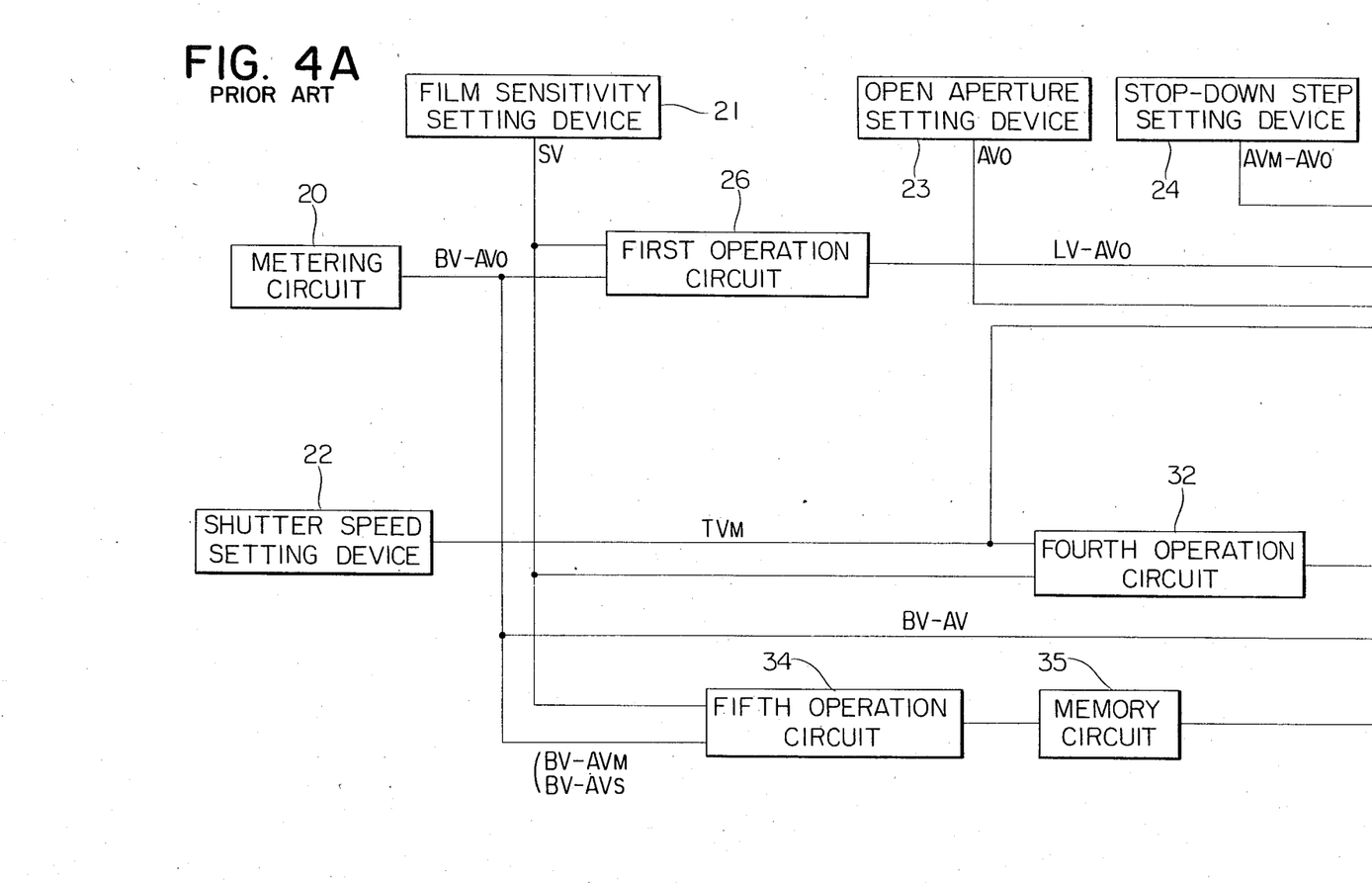

FIG. 4 is a block diagram of an automatic exposure control apparatus which performs the TTL light intensity feedback metering in a camera having both the shutter priority mode and the aperture priority mode. In the description to follow, the aperture, the shutter speed, the luminance, and the film speed are represented in the additive system of photographic exposure. A metering circuit 20 including the light-receiving elements 10 described above generates, before the shutter release operation, a metering output which corresponds to $(BV - AV_O)$ for performing the indication calculation and, in the stop-down mode, a metering output corresponding to $(BV - AV)$ where BV is the brightness of the object, AV is the aperture during the stop-down, and $AV_O$ is the open aperture. A film sensitivity setting device 21 generates an output corresponding to a film sensitivity SV. A shutter speed setting device 22 including a shutter dial generates an output corresponding to a preset shutter speed $TV_M$. An open aperture setting device 23 and a stop-down step setting device 24 including the aperture ring respectively generate outputs corresponding to the open aperture $AV_O$ and the number of stop-down steps $(AV_M - AV_O)$ where $AV_M$ is the preset aperture set by the aperture ring or the like. An exposure control mode setting device 25 generates a signal of high level (to be referred to as H hereinafter) in the shutter priority mode (to be referred to as the S mode) and a signal of low level (to be referred to as L hereinafter) in the aperture-priority mode (to be referred to as the A mode hereinafter).

A first operation circuit 26 adds the metering output $(BV - AV_O)$ from the metering circuit 20 and the film speed SV from the film sensitivity setting device 21 and obtains:

$$(BV - AV_O) + SV = (BV + SV) - AV_O = LV - AV_O \quad (1)$$

where LV is the light value and is given by:

$$LV = BV + SV \quad (2)$$

A second operation circuit 27 receives the output $(LV - AV_O)$ from the first operation circuit 26 and the number of stop-down steps $(AV_M - AV_O)$ from the setting device 24 and calculates $TV_S$ which is a control shutter speed for obtaining an optimal exposure for the preset aperture $AV_M$ and which is given by:

$$(LV - AV_O) - (AV_M - AV_O) = LV - AV_M = TV_S \quad (3)$$

A third operation circuit 28 receives the output $(LV - AV_O)$ from the first operation circuit 26 and the preset shutter speed $TV_M$ from the setting device 22 and calculates $AV_S$ which is a control aperture for obtaining an optimal exposure for the preset shutter speed $TV_M$ and which is given by:

$$(LV - AV_O) + AV_O - TV_M = LV - TV_M = AV_S \quad (4)$$

When a mode signal from the setting device 25 is L indicating the A mode, a gate 29 is enabled to supply the output $TV_S$ from the operation circuit 27 to an indicator 31. In response to the mode signal of L level, the indicator 31 indicates the control shutter speed.

When a mode signal from the setting circuit 25 is H indicating the S mode, a gate 30 is enabled to supply the output $AV_S$ from the operation circuit 28 to the indicator 31. In response to the mode signal of H level, the indicator 31 indicates the control aperture.

A fourth operation circuit 32 receives the film sensitivity SV from the setting device 21 and the shutter speed $TV_M$ from the setting device 22 and calculates $(TV_M - SV)$.

An aperture control device 33 controls to stop the stop-down aperture at a given aperture during the stop-down operation in the S mode so as to obtain a predetermined aperture. In the A mode, since the mode signal from the setting device 25 is L and disabled, the stop is closed to the preset aperture $AV_M$ by the aperture ring by a known conventional mechanism (not shown). In the S mode, the mode signal from the setting device 25 is H and enabled. Therefore, the aperture control device 33 receives the output $(TV_M - SV)$ from the operation circuit 32 and the metering output $(BV - AV)$ during the stop-down control from the metering circuit 20, and compares the two inputs. When the two inputs become equal to each other, that is, when the following equation is established:

$$BV - AV = TV_M - SV \quad (5)$$

the aperture control device 33 stops the stop-down operation. When the value of AV which satisfies the equation (5) above is represented by $AV_S$, substitution of $AV_S$ in AV in the equation (5) yields:

$$BV + SV = TV_M + AV_S \quad (6)$$

The value of $AV_S$ satisfying this equation is the optimal aperture corresponding to the preset shutter speed. However, the exposure determined by the values of $TV_M$ and $AV_S$ includes the exposure error as indicated in FIG. 2. $AV_S$ corresponds to the output $AV_S$ from the operation circuit 28 for indication.

A fifth operation circuit 34 receives the metering output $(BV - AV_M)$ in the A mode or the metering output $(BV - AV_S)$ in the S mode after the stop-down from the metering circuit 20 and the film sensitivity SV from the setting device 21, and performs the following calculation. More specifically, in the A mode, the stop is closed to the preset aperture $AV_M$ by a mechanism (not shown) to satisfy:

$$(BV - AV_M) + SV = (BV + SV) - AV_M = LV - AV_M \quad (7)$$
$$= TV_S$$

where $TV_S$ is the shutter speed for obtaining the optimal exposure for the preset aperture $AV_M$. (Note that in this case the exposure determined by $AV_M$ and $TV_S$ includes the exposure error as shown in FIG. 2). $TV_S$ corresponds to the output $TV_S$ from the operation circuit 27 for indication.

In the S mode, the stop is closed to $AV_S$ and the operation circuit 34 produces:

$$(BV - AV_S) + SV = (BV + SV) - AV_S = TV_M \quad (8)$$

$TV_M$ corresponds to the preset shutter speed $TV_M$ in accordance with the equation (6).

A memory circuit 35 stores the output $TV_S$ (or $TV_M$) which is produced by the operation 34 immediately before the upward movement of the quick return mirror 3. A shutter speed control circuit 36 of known configuration controls the shutter speed in accordance with the stored value of $TV_M$ or $TV_S$.

The characteristic features of a camera for performing such TTL light intensity feedback system control reside in that a lens of a relatively large thickness can be used since an interlock pin for an interchangeable lens is not required, and the exposure error is small, and the optimal exposure is easy to obtain since the exposure control is performed in accordance with the aperture which is actually being controlled during aperture control.

In the conventional cameras of light intensity feedback system including the TTL light intensity feedback system, the exposure error as shown in FIG. 2 is generated but exposure control to compensate for this error is not performed. However, this exposure error is eliminated in accordance with the present invention.

Figures 5, 5B:
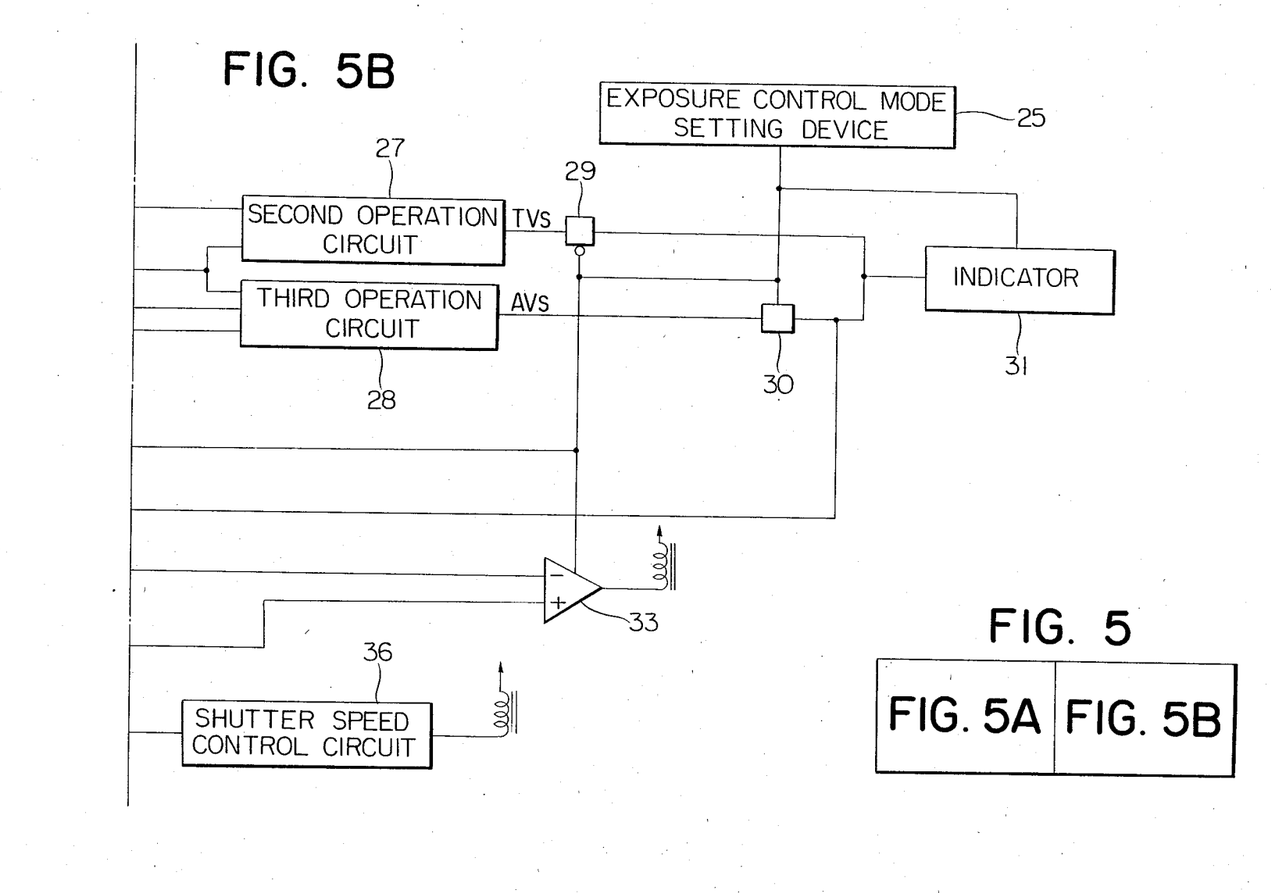
FIG. 5 composed of FIGS. 5A and 5B is a block diagram of an exposure control apparatus for a camera according to a first embodiment of the present invention.
Figure 5A:
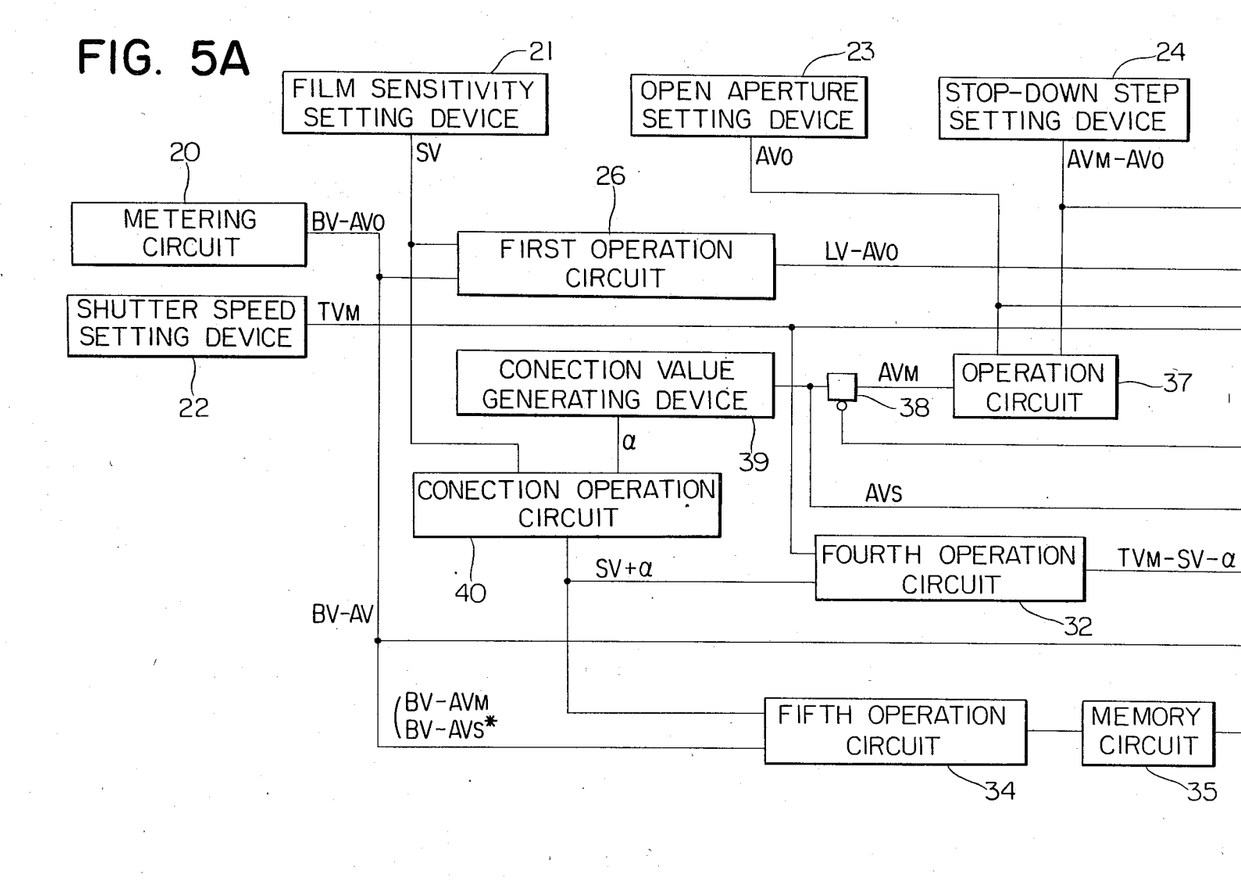

FIG. 5 is a block diagram of an exposure control apparatus for a camera according to an embodiment of the present invention. Members 20 to 36 in FIG. 5 operate in the same manner as those in FIG. 4, and additional members 37 to 40 are added in FIG. 5. An operation circuit 37 adds the open aperture $AV_O$ from the setting device 23 and the number of stop-down steps $(AV_M - AV_O)$ from the setting device 24 and produces the preset aperture $AV_M$. In response to the mode signal of L level supplied from the setting device 25 in the A mode, a gate 38 is enabled to supply the preset aperture $AV_M$ to a correction value generating circuit 39. However, in response to the mode signal of H level supplied from the setting device 25 in the S mode, a gate 30 is enabled to supply the output $AV_S$ from the operation circuit 28 to the correction value generating circuit 39. In this manner, the correction value generating circuit 39 receives the preset aperture $AV_M$ or the control aperture $AV_S$ in accordance with the selected mode. The correction value generating circuit 39 generates a correction value $\alpha$ which is a function of the aperture ($AV_M$ or $AV_S$). A correction operation circuit 40 adds the film sensitivity SV from the setting device 21 and the output $\alpha$ from the correction value generating circuit 39 and generates $(SV + \alpha)$.

Figure 6:
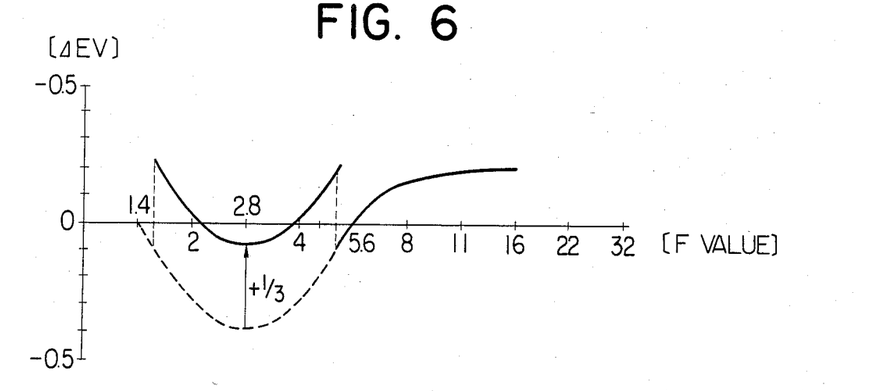
FIG. 6 is a graph for explaining the correction method of a metering error according to the present invention.

FIG. 6 is a graph for explaining the method for reducing the range of change of the exposure error. The dotted line in FIG. 6 corrresponds to that shown in FIG. 2. When the exposure is shifted in the overexposure direction from the position obtained by adding $\frac{1}{3}$ step to F 1.4 (EV) to the position obtained by adding $\frac{2}{3}$ steps to F 4, the range of change of the exposure error is reduced. In FIG. 2, the changes in the exposure error fall within the range between $-0.4$ and $+0.2$ (EV), i.e., within the range of 0.6 (EV). However, in the graph shown in FIG. 6, the changes in the exposure error fall within the range betwen $-0.1$ and $+0.2$ (EV), i.e., within the range of 0.3 (EV). The correction value generating circuit 39 and the operation circuit 40 shown in FIG. 5 are for performing the exposure correction operation as indicated by the solid line in FIG. 6. In accordance with the value of the aperture $AV_S$ or $AV_M$, the correction value generating circuit 39 generates one of the following values:

When $AV_S$ (or $AV_M$) $\leq 1\frac{1}{3}$, $$\alpha = 0 \quad (9)$$

When $1(\frac{1}{3}) < AV_S$ (or $AV_M$) $< 4(\frac{2}{3})$, $$\alpha = -\frac{1}{3} \quad (10)$$

When $4(\frac{2}{3}) \leq AV_S$ (or $AV_M$), $$\alpha = 0 \quad (11)$$

The operation circuit 40 adds the correction value $\alpha$ to the film sensitivity SV from the setting device 21. When the correction value $\alpha$ $(-\frac{1}{3})$ is added, the film sensitivity is decreased to correct the exposure toward the overexposure side.

In this manner, since the exposure correction is performed by correcting the film sensitivity, in the A mode, the shutter speed is controlled to provide the exposure as indicated by the solid line shown in FIG. 6. However, in the S mode, the aperture is controlled to provide the exposure as indicated by the solid line shown in FIG. 6 so that the shutter speed is controlled to coincide with the preset shutter speed. Therefore, in either of the A and S mode, the exposure is controlled in accordance with the solid line shown in FIG. 6, and the exposure error is reduced in comparison with the case of the circuit shown in FIG. 4 which is controlled as in FIG. 2. The above process will now be described in further detail below.

In the A mode, the stop is closed by a mechanism (not shown) to the preset aperture $AV_M$, and the metering output for the aperture control becomes $(BV - AV_M)$. Meanwhile, since the output from the operation circuit 40 is $(SV + \alpha)$, the output from the operation circuit 34 is obtained as follows by substituting $(SV + \alpha)$ in the equation (7):

$$(BV - AV_M) + (SV + \alpha) = (BV + SV) - AV_M + \alpha \quad (12)$$
$$= LV - AV_M + \alpha$$
$$= TV_S^* + \alpha$$

In this manner, the shutter speed is controlled to be $TV_S^*$. Note that $TV_S^*$ is a corrected value for obtaining the exposure value indicated in FIG. 6. When the equation (10) is established, the correction value $\alpha$ is $-\frac{1}{3}$. Then, the shutter speed is shifted toward the lower speed side from the TV value by $\frac{1}{3}$ (EV) so that the exposure is corrected toward the overexposure side.

In the S mode, an aperture control device 33 receives the output $(TV_M - SV - \alpha)$ from the operation circuit 32 and the metering output $(BV - AV)$ during the stop-down process from the metering output 20. If the value of AV when the following relation (13) obtained by substituting $(SV - \alpha)$ in the equation (5) is represented by $AV_S^*$:

$$BV - AV = TV_M - SV - \alpha \quad (13)$$

the following equation is obtained (note that $AV_S^*$ is a corrected value):

$$BV+SV=TV_M+(AV_S^*-\alpha) \qquad (14)$$

In this manner, the aperture is controlled to be $AV_S^*$. The control aperture $AV_S^*$ has a value for obtaining the exposure shown in FIG. 6.

When the equation (10) above is satisfied, correction value $\alpha$ is $-\frac{1}{3}$. When a comparison is made between the equations (6) and (14), the actual control aperture $AV_S^*$ is smaller by $\frac{1}{3}$ (EV) than the control aperture $AV_S$ which was calculated to obtain the optimal exposure. In other words, the aperture is corrected in the direction to open the stop by a degree corresponding to $\frac{1}{3}$ (EV). The metering output from the metering circuit 20 after the aperture control is obtained to be $(BV-AV_S^*)$ based on the corrected aperture $AV_S^*$. Therefore, the output from the operation circuit 34 is added to the output $(SV+\alpha)$ from the operation circuit 40 and the following equation is obtained from the equation (8):

$$(BV - AV_S^*) + SV + \alpha = (BV + SV) - AV_S^* + \alpha \qquad (15)$$
$$= TV_M$$

This corresponds to the preset shutter speed preset in accordance with the equation (14).

In this manner, in the S mode, the shutter speed is controlled to take a value corresponding to the preset value so that the exposure is changed in accordance with changes in the aperture.

In this manner, the aperture or the shutter speed is controlled, and the exposure correction shown in FIG. 6 is performed. In this embodiment, the exposure within a predetermined range of F number $F_{NO}$ is shifted by a predetermined amount. However, the exposure shift amounts may be varied in accordance with each of a plurality of ranges of F number $F_{NO}$.

Figure 7:
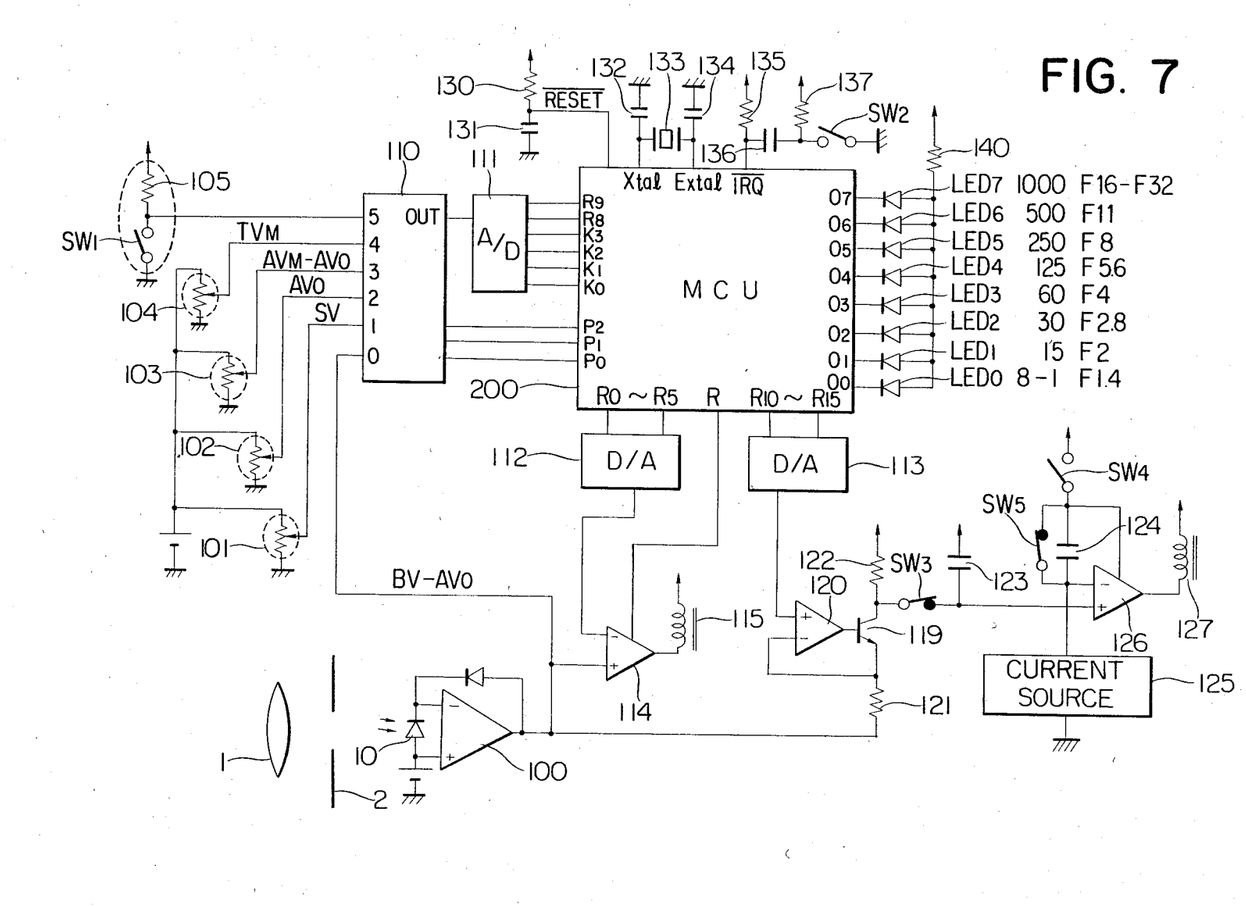
FIG. 7 is a detailed block diagram of the apparatus according to the embodiment of the present invention.

FIG. 7 is a block diagram of an example of the embodiment shown in FIG. 5. The operation of the circuit of this block diagram will be clarified in accordance with the flow chart shown in FIG. 9.

A metering circuit 100 has a known configuration and meters the intensity of light which has passed through the lens 1 and the stop 2. The metering circuit 100 produces an output $(BV-AV_O)$ while the shutter is open and an output $(BV-AV)$ while the stop 2 is closed. Setting devices 101 to 104 respectively preset the film sensitivity SV, the open aperture $AV_O$, the preset number of stop-down steps $(AV_M-AV_O)$, and the preset shutter speed $TV_M$, and respectively produce analog quantities corresponding to the respective preset values. An analog switch circuit 110 produces from its "OUT" terminal one of the analog quantities received at corresponding input terminals "5" to "0" which is set by one of "5", "4", "3", ..., "0" set by ports P2 to P0 of a microcomputer unit (to be referred to as an MCU hereinafter) 200. A 6-bit A/D converter 111 converts the analog quantity selected by the analog switch circuit 110 into a digital quantity and supplies the upper two bits thereof to ports R9 and R8 and the lower four bits to ports K3 to K0 of the MCU 200. A 6-bit D/A converter 112 converts the analog quantity determined by terminals R5 to R0 of the MCU 200 and therefore serves a similar purpose to that of the operation circuit 32 shown in FIG. 5.

A 6-bit D/A converter 113 generates an analog quantity determined by terminals R15 to R10 of the MCU 200 and serves a similar purpose to that of the operation circuit 40 shown in FIG. 5.

An aperture control device 114 functions in the same manner as the device 33 shown in FIG. 4. The aperture control device 114 is actuated when the terminal R6 of the MCU 200 goes to L level after the shutter release operation. A magnet 115 is for stopping the stop-down operation.

The noninverting input terminal of an OP amplifier 120 receives the analog quantity corresponding to ($33-SV^*$) (in this case, $SV^*$ corresponds to $(SV+\alpha)$) set at the D/A converter 113. The inverting input terminal of the OP amplifier 120 and one end of a resistor 121 connected to the emitter of a transistor 119 are kept at the same potential as that at the noninverting input terminal of the OP amplifier 120. Note that $ in this context signifies the hexadecimal number. Therefore, decimal numbers 1, 2, 3, ..., 15 are $1, $2, ..., $A, $B, ..., $F in the hexadecimal number. The hexadecimal number $33 above corresponds to the reference value of the D/A converter 113. The D/A converter 113 generates an analog signal which represents the amount of change of the input signal from $33. The potential of the metering circuit 100 is applied to the other end of the resistor 121. That end of the resistor 121 which is connected to the metering circuit 100 is kept at a potential $(BV-AV_{M \cdot S}^*)$ when the stop is closed to $AV_M$ or $AV_S^*$ (which will be referred to as $AV_{M \cdot S}^*$ hereinafter) and the mirror is about to move upward. Therefore, the potential difference across the two ends of the resistor 121 is ($33-SV^*)-(BV-AV_{M \cdot S}^*)$. When the current amplification factor $h_{FE}$ of the transistor 119 is high, substantially the same current flows to resistors 121 and 122. Therefore, if the resistances of these resistors are the same, the potential difference across the two ends of the resistor 122 is also equal to $\{(\$33-SV^*)-(BV-AV_{M \cdot S}^*)\}$. This value corresponds to ($33-TV_{M \cdot S}^*$). Note that $TV_{M \cdot S}^*$ means $TV_M$ or $TV_S^*$ described above and is the shutter speed which satisfies the APEX equation below when the stop is closed to $AV_{M \cdot S}^*$:

$$BV+SV^*=TV_{M \cdot S}^*+AV_{M \cdot S}^* \qquad (16)$$

The transistor 119 and the resistors 121 and 122 correspond to the operation circuit 34 shown in FIG. 5. A switch SW3 is turned off when the mirror is moved up and is turned on after the mirror is moved down. A memory capacitor 123 corresponds to the value ($33-TV_{M \cdot S}^*$) immediately before the mirror is moved up and stores this potential when the switch SW3 is turned off. The capacitor 123 corresponds to the memory circuit 35 shown in FIG. 5.

Members 124 to 126 serve the purpose of the shutter control device 36 shown in FIG. 5. When the mirror is moved up, a switch SW4 is turned on and a comparator 126 is actuated. At this time, a trigger switch SW5 which is turned off in synchronism with the movement of the shutter front curtain or leading curtain is still ON. Therefore, the output from the enabled comparator 126 goes to L level to energize a shutter magnet 127. Before the trigger switch SW5 is turned off, the locked state of the leading curtain by a mechanical member is changed to that of the rear curtain or trailing curtain and the trailing curtain is held. When the leading curtain is moved and the trigger switch SW5 is turned off, a timer capacitor 124 is charged by a current source 125 and a voltage is generated across the two ends of the capacitor 124. In correspondence with the potential ($33−$TV$_{M\cdot S}$*) stored in the memory capacitor 123, when the shutter speed is high (when TV$_{M\cdot S}$* is large), the output from the comparator 126 is inverted when the charge is stored on the capacitor 124 within a short period of time. The shutter magnet 127 is deenergized, the trailing curtain is released, and the proper shutter speed is attained. However, when TV$_{M\cdot S}$* is small, the charge time on the capacitor 124 is long, and the shutter is controlled at low speed. Therefore, a resistor 130 and a capacitor 131 supply a voltage to a terminal $\overline{\text{RESET}}$ of the MCU 200 to perform the reset operation after the power on. Capacitors 132 and 134 and an oscillator 133 are connected to terminals "Xtal" and "EXtal" of the MCU 200 to generate a reference clock by an internal oscillator. Resistors 135 and 137 and a capacitor 136 constitute a differentiator circuit of a release switch SW2 and are connected to a terminal $\overline{\text{IRQ}}$ of the MCU 200 so as to request an interruption when the release operation is performed.

Cathodes of LED7 to LED0 are connected to terminals O7 to O0 of the MCU 200, and the anodes thereof are connected to the power source through a resistor 140. When one of the terminals O7 to O0 of the MCU 200 goes to L level, a corresponding one of the LED7 to LED0 is turned on. For this LED array, an indication film of "1000", . . . , "8-1" is selected when the A mode is selected by the mode switch SW1 and an indication film of "F 16-F 32", "F11", . . . , "F1.4" is selected when the S mode is selected. Either indication film is indicated within the viewfinder. The MCU 200 is a 4-bit microcomputer. The memory space of the RAM in the MCU 200 is used as in Table 1 below. Since the MCU 200 is a 4-bit microcomputer, 2 words are used as a single register and are designated by Z. Note that X and Y represent X and Y registers.

TABLE 1

|  | 1 | 0 | X/Y |
|---|---|---|---|
| Z$_0$ | (BV − AV$_O$) |  | 0 |
| Z$_1$ | SV |  | 1 |
|  | SV* |  |  |
| Z$_2$ | (AV$_O$) |  | 2 |
| Z$_3$ | (AV$_M$ − AV$_O$) |  | 3 |
| Z$_4$ | (TVM) |  | 4 |
| Z$_5$ | Exposure control mode |  | 5 |
| Z$_6$ | (AV$_M \cdot S$) |  | 6 |
| Z$_7$ | (DV) |  | 7 |
| Z$_8$ | 11111110∼01111111 |  | 8 |
| Z$_9$ | $18 + TV − SV* |  | 9 |
| Z$_{10}$ | $33 − SV* |  | 10 |

Figure 8:
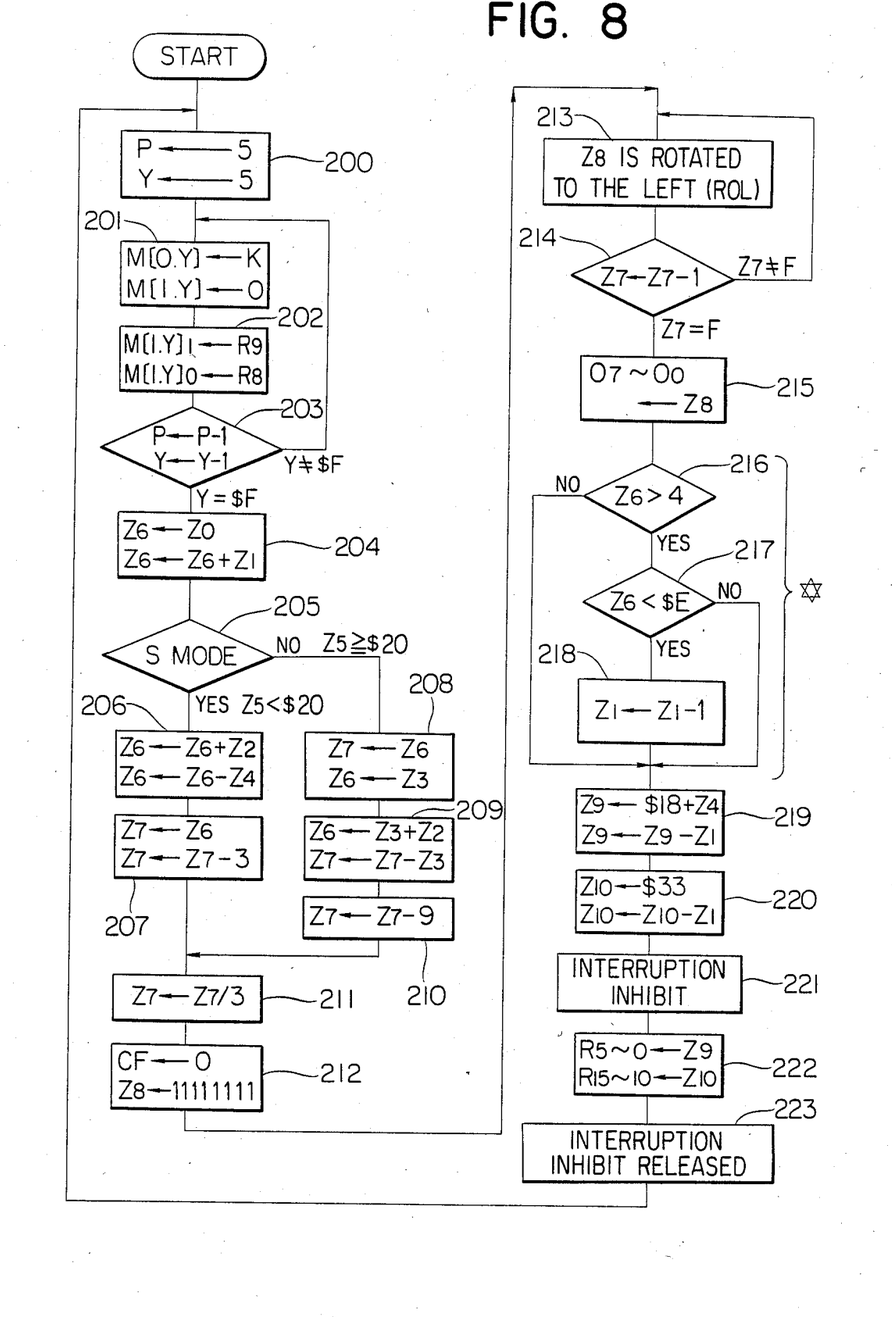
FIG. 8 is a flow chart of the operation sequence of an MCU 200.

FIG. 8 is a flow chart of the MCU 200. A description will now be made with reference to FIG. 8.

As a first operation, all the preset values must be inputted. In step 200, the P port output is set to be .5, and the Y register is set to be 5. Note that hereinafter M[a, b] is a 4-bit memory area of the RAM which is designated in the Table 1 when the X register is a and the Y register is b. Then, in step 201, the 4-bits of the K port are stored in a memory area M[0, Y], and a memory area M[1, Y] is cleared. In step 202, inputs to the ports R9 and R8 are set in memory areas M[1, Y]$_1$ and M[1, Y]$_0$ which indicate digits of $2^1$ and $2^0$ of the memory area M[1, Y]. The number n at the right lower corner of large brackets of the memory area M[a, b]$_n$ indicates that the memory area corresponds to the digit of $2^n$. Thereafter, the values of P and Y are decreased by one, and the above operation is repeated until Y=$F. Then, the digital quantities corresponding to the analog quantities of the setting devices 105 to 101 and the metering circuit 100 shown in FIG. 7 are stored in registers Z5, Z4, . . . , Z0 as shown in Table 1.

In step 204, calculation of the indication output is performed. First, the contents of a register Z0 are transferred to a register Z6, and the contents of a register Z1 are added to set in the register Z6:

$$(BV - AV_O) + SV = LV - AV_O \tag{1}$$

In step 205, it is discriminated if the selected mode is the S mode. If the selected mode is determined to be the S mode, the mode switch SW1 is turned on, the output from the setting device 105 goes to L level, and "$00" is stored in a register Z5. However, if the selected mode is determined to be the A mode, the mode switch SW1 is turned off, the output from the setting device 105 goes to H level, and "$3F" is stored in the register Z5. Therefore, when $$Z5 < \$20 \tag{17}$$

it is determined that the S mode is selected. In the S mode, in step 206, the contents of the register Z2 are added to those in the register Z6 and the contents of a register Z4 are subtracted therefrom. Then, the register Z6 stores:

$$(LV - AV_O) + AV_O - TV_M = LV - TV_M \tag{4}$$
$$= AV_S$$

The register Z6 serves as a memory for storing the aperture AV$_M$ or AV$_S$ (to be referred to as AV$_{M\cdot S}$ hereinafter) which provides an optimal exposure irrespective of the selected mode. In the S mode, AV$_{M\cdot S}$ is AV$_S$. In step 207, the contents of the register Z6 are transferred to a register Z7, and 3 (corresponding to 1 (EV)) is subtracted from the transferred contents. This is because the register Z7 is a register which stores an APEX value DV associated with the indication and is started from F 1.4 (AV=1) when the F number indication is performed in the S mode.

Meanwhile, in the A mode wherein the following relation is satisfied:

$$Z5 \geq \$20 \tag{18}$$

in step 208, the contents of the register Z6 are transferred to the register Z7, and the number of stop-down steps (AV$_M$−AV$_O$) in the register Z3 is stored in the register Z6. In step 209, AV$_O$ in the register Z2 is added to the register Z6, and the register Z6 stores:

$$(AV_M - AV_O) + AV_O = AV_M \tag{19}$$

In other words, in the A mode, AV$_{M\cdot S}$ is AV$_M$. Meanwhile, since (LV−AV$_O$) which has been stored in the register Z6 is stored in the register Z7, subtraction of (AV$_M$−AV$_O$) of the register Z3 therefrom provides:

$$(LV - AV_O) - (AV_M - AV_O) = LV - AV_M \tag{3}$$
$$= TV_S$$

thereby providing a control shutter speed TV$_S$ for obtaining the optimal exposure. Thereafter, as shown in FIG. 7, 9 is subtracted so as to start the shutter speed indication from "8-1" and $\frac{1}{8}$ (TV=3).

The subsequent control operations are the same in either the A or S mode. In step 211, the contents of the register Z7 are set to be $\frac{1}{3}$ so as to convert the indication value DV having a $\frac{1}{3}$ step (EV) to 1. Next, in step 212, a carry flag CF is set to 0, and a register Z8 is set to be 11111111B (where B indicates the binary number). In step 213, the register Z8 is rotated to the left including the carry flag CF. Thus, we obtain:

CF=1
Z8=11111110B

The subtraction by one of the contents of the register X7 is repeated until the value reaches a value $F corresponding to a negative value. Then, one of "11111110B", "11111101B", . . . , "10111111B", "01111111B" is stored in the register Z8. For example, when 5 is stored in the register Z7, the register Z8 stores "11011111B", and the digit of $2^5$ becomes "0". When the contents of the register Z7 are supplied to the ports $O_7$ to $O_0$, a specific LED can be turned on. When Z7 is 5, the $O_5$ output is L, the LED 5 is turned on, and "250" or "F8" is indicated in accordance with the selected mode.

The following portion of the flow corresponds to the correction operation of the metering error shown in FIG. 2. In step 216, since the stop-down aperture $AV_{M \cdot S}$ is stored in the register Z6, it is compared with the value 4 corresponding to $1(\frac{1}{3})$ (EV), and we have:

$$AV_M(\text{or } AV_S) > 1(\tfrac{1}{3}) \tag{20}$$

In step 217, the aperture $AV_{M \cdot S}$ is compared with $E corresponding to $4(\frac{2}{3})$ (EV). When the following relation is established:

$$AV_M (\text{or } AV_S) < 4(\tfrac{2}{3}) \tag{21}$$

in step 218, 1 corresponding to $\frac{1}{3}$ (Ev) is subtracted from the register Z1 storing the film sensitivity SV. When neither of the two relations above is established, this operation is not performed. Therefore, the corrected film sensitivity SV according to the equations (9) to (11) is obtained which corresponds to the output (SV+α) from the operation circuit 40 shown in FIG. 5.

The next portion of the flow chart is for controlling the D/A converters 112 and 113 shown in FIG. 7. The register Z9 is used to control the D/A converter 112. In step 219, $18 is stored in the register Z9 and $TV_M$ in the register Z4 is added thereto. Here $18 in the D/A converter 112 corresponds to $33 in the D/A converter 113. Next, the corrected film sensitivity SV* in the register Z1 is subtracted from the sum as:

$$\$18 + TV_M - SV^*$$

The result is stored in Z9. The register Z10 is used to control the D/A converter 114. In step 220, $33 is stored and the contents of the register Z1 are subtracted therefrom to store in the register Z1:

$$\$33 - SV^*$$

Next, in step 221, an interruption inhibit state is established. In step 222, the contents of the registers Z9 and Z10 are supplied to the ports R5 to R0 and R15 to R0. When a release interruption is generated when the value for controlling the D/A converter changes, an erratic operation is caused. Therefore, the interruption inhibit state is established. After the contents transfer, the interruption inhibit state is released in step 223.

In this manner, one sequence before depression of the shutter release button (before release) is completed. Thereafter, the operation mode is returned to the start operation, and the above operation is repeated again.

Figure 9:
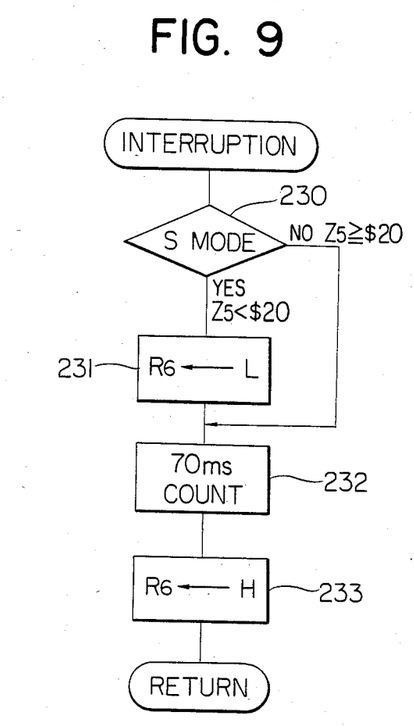
FIG. 9 is a flow chart of an interruption routine of the MCU 200.

FIG. 9 shows a flow chart of an interruption routine when the shutter release button is depressed, the release switch SW2 is turned on, and the terminal $\overline{\text{IRQ}}$ of the MCU 200 goes to L level.

When the equation (17) is established to determine that the selected mode is the S mode in step 230, the terminal R6 in FIG. 7 is set at L level in step 231. Then, the aperture control device 114 is actuated. Thereafter, in synchronism with operation of the shutter release button, the stop-down operation is started. When the following equation is established:

$$BV - AV = \$18 + TV_M - SV^* \tag{22}$$

the output from the aperture control device 114 goes to L level, the stop-down stop magnet is energized, and the stop-down operation is stopped. The aperture AV obtained in this manner becomes AV* described above.

In the A mode wherein the equation (18) above is established, since the terminal R6 is kept at H, the aperture control device 114 is not energized. Therefore, the aperture is controlled in accordance with the non-corrected preset aperture $AV_M$. In either of the A or S mode, when the stop-down operation is completed, the output from the metering circuit 100 becomes $(BV - AV_{M \cdot S}^*)$. Since the output from the D/A converter 113 becomes $(\$33 - SV^*)$, a value corresponding to $(\$33 - TV_{M \cdot S}^*)$ is stored in the memory capacitor. When the mirror switch SW5 is turned off in synchronism with the mirror up movement, the exposure control is performed in accordance with the stored shutter speed $TV_{M \cdot S}^*$. In step 232, immediately after the shutter release operation, 70 ms is counted by the internal timer of the MCU 200 and the port R6 is set at H level. The stop-down operation has been completed before 70 ms is counted. Thereafter, in step 233, the output from the port R6 is set at H level. In accordance with the control shutter speed, the MCU 200 is returned to the state immediately before the interruption in the flow chart shown in FIG. 8 during the mirror up movement. However, this does not influence the shutter control mechanism.

As can be seen from the block diagram shown in FIG. 7, the control aperture $AV_S^*$ and the control shutter speed $TV_S^*$ are obtained by correction as shown in FIG. 6 of the preset values $TV_M$ and $AV_M$ in accordance with the values actually set in the D/A converters 112 and 113 so as to achieve an optimal exposure.

Figure 10:
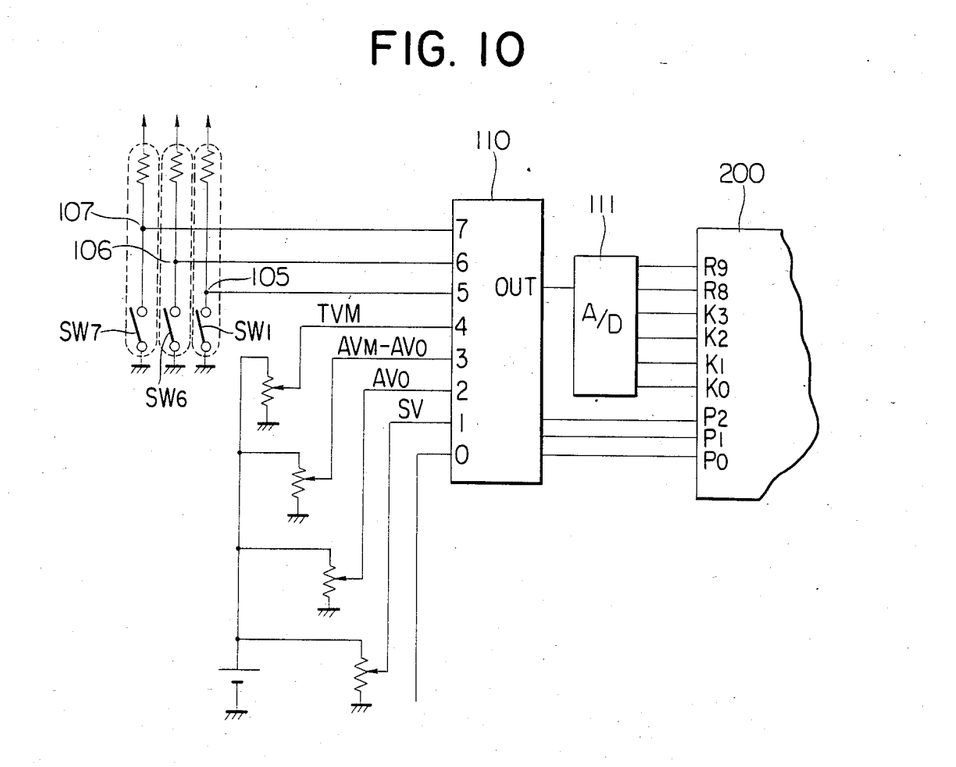
FIG. 10 is a block diagram of an exposure control apparatus for a camera according to a second embodiment of the present invention.

FIG. 10 is a block diagram showing another example of the apparatus shown in FIG. 5. The example shown in FIG. 10 is different from that shown in FIG. 7 in that the setting device 106 comprising a switch SW6 which is turned on upon mounting a teleconversion lens, and the setting device 107 comprising a switch SW7 which is turned on when a finder screen with a different metering error is mounted are connected to the analog switch circuit 110. However, when a teleconversion lens is connected to a master lens, an open aperture $AV_O$ of the master lens is transmitted at the open aperture of a photographic lens consisting of the teleconversion lens and the master lens.

Figure 11:
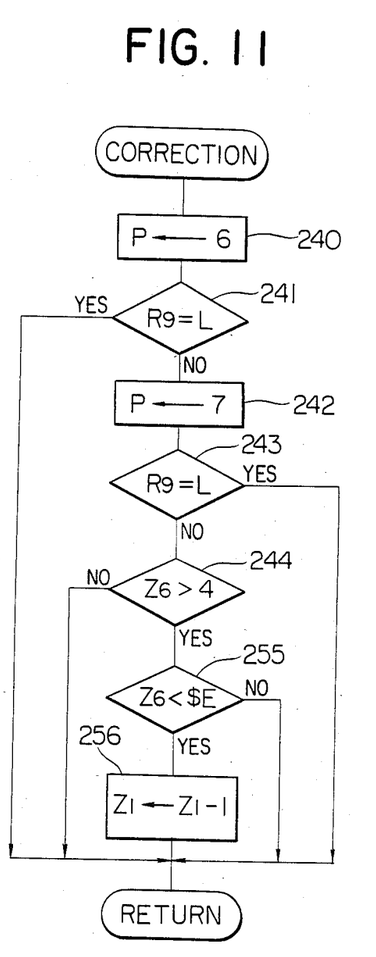
FIG. 11 shows a part of the flow chart in the second embodiment of the present invention.
Figure 12:
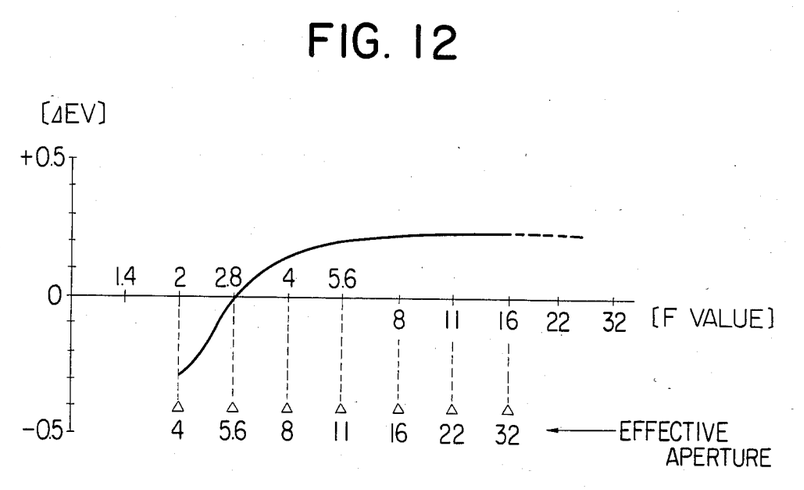
FIG. 12 is a graph for explaining a measuring error when a teleconversion lens is mounted.

FIG. 11 shows a part of the flow chart of the MCU 200 of the example shown in FIG. 10 and corresponds to a part indicated by a star mark * in FIG. 8. The remaining portions of the flow chart are the same as those shown in FIG. 8. At the start of the flow chart portion indicated by the star mark * in FIG. 8, the P port is set at 6 in step 240, and it is checked in step 241 if the terminal R9 is at L level. When a teleconversion lens is interposed between the camera and the master lens so as to double the focal length of the master lens, the switch SW6 is turned on, and the analog quantity from the setting device 106 becomes "0". Therefore, the digital value which is selected by the analog switch circuit 110 and which is converted by the A/D converter 111 is $00. Therefore, the terminal R9 which receives the MSB goes to L level. At this time, the correction operation is not performed. FIG. 12 shows the metering error when the teleconversion lens is mounted. Since the metering error acts with an effective aperture, the graph shown in FIG. 2 is parallel-shifted by two steps to the left (since metering output is not transmitted with the effective aperture). The curve does not extend to F 1.4 since the maximum aperture is narrowed by the teleconversion lens. In this manner, since the extreme underexposure state as shown in FIG. 2 is eliminated, the correction as shown in FIG. 6 is not performed. Although a fine correction near F 2 also results in a good effect, it is very rare to use a teleconversion lens in an open aperture state. Therefore, a corresponding correction is omitted.

Figure 13:
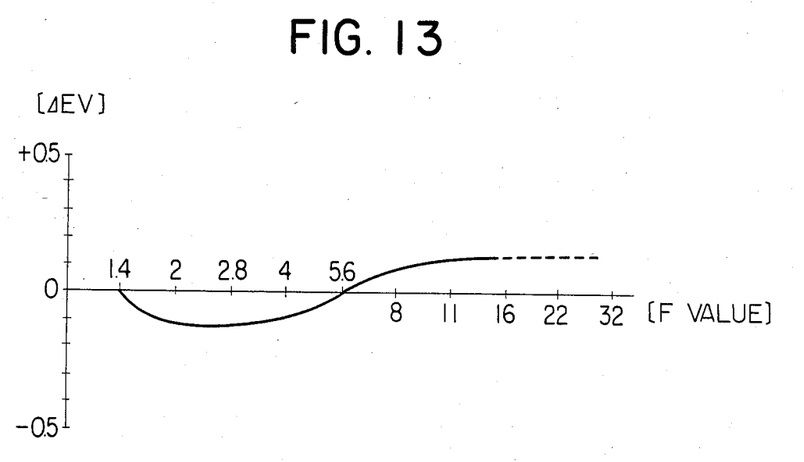
FIG. 13 is a graph for explaining a measuring error when a screen with a good dispersion property is mounted.

In step 242, 7 is set at the P port and it is checked if the terminal R9 is set at L level. When a screen with a good dispersion effect is mounted, a switch SW7 is turned on, and the analog quantity from the setting device 107 becomes "0". In this case, the digital value which is selected by the analog switch circuit 110 and which is A/D converted by the A/D converter 111 is $00, and the terminal R9 which receives the MSB goes to L level. A correction operation is not performed in this case. The metering error with a screen having a good dispersion property is small as shown in FIG. 13, and the correction need not be performed in this case. If the correction value is determined to be fine such as a 1/6 (EV) step in place of the ⅓ (EV) step, a better effect is obtained.

When both the switches SW6 and SW7 are turned off, the analog values from the setting devices 106 and 107 are H, the A/D conversion value from the analog switch circuit 110 is $3F, H is inputted to the terminal R6, and the same sequence as shown in FIG. 7 is performed. According to the present invention, an arrangement can be adopted wherein a plurality of teleconversion lenses can be identified, and a different correction value is set for each teleconversion lens.

I claim:

1. A camera having stop-down means for stopping down a stop of a photographic lens and means for exposing a film in accordance with a preset shutter speed to provide an optimal exposure, comprising:
   (a) a metering optical system arranged behind said photographic lens with respect to an object;
   (b) means for generating a light intensity signal representing a light intensity from the object through said metering optical system and said photographic lens;
   (c) calculating means for calculating an aperture value to provide an optimal exposure in accordance with the light intensity signal and the preset shutter speed and for producing an aperture signal indicative of said calculated aperture value;
   (d) means for detecting that the aperture value represented by said aperture signal falls within a predetermined range and for generating a detection signal; and
   (e) control means for controlling said stop-down means, the control means controlling said stop-down means so that the control means has an aperture value different from said aperture value represented by said aperture signal, in accordance with said detection signal.

2. A camera according to claim 1, wherein said detection signal shows a predetermined value and said control means controls said stop-down means so that said stop reaches an aperture value shifted from said aperture value represented by said aperture signal by amounts corresponding to the predetermined value indicative of said detection signal.

3. A camera according to claim 1, wherein said control means controls said stop-down means so that when said detection signal is not generated, said stop reaches said aperture value represented by said aperture signal.

4. A camera according to claim 1, wherein said metering optical system includes an interchangeable optical member, said camera further comprising means for detecting optical characteristics of said interchangeable optical member and for generating another detection signal and said control means controlling said stop-down means in accordance with said another detection signal.

5. A camera in which a stop of a photographic lens is stopped down to a preset aperture value and a shutter is controlled to provide an optimal exposure, comprising:
   (a) a metering optical system arranged behind said photographic lens with respect to an object;
   (b) means for generating a light intensity signal representing a light intensity from the object through said metering optical system and said photographic lens;
   (c) means for generating an aperture signal representing the preset aperture value;
   (d) means for detecting that the aperture value represented by the aperture signal falls within a predetermined range and for generating a detection signal;
   (e) calculating means for calculating a shutter speed to provide the optimal exposure in accordance with said light intensity signal and said preset aperture value; and
   (f) control means for controlling said shutter, said control means controlling said shutter so that said shutter is operated at a shutter speed different from the shutter speed calculated by said calculating means, in accordance with said detection signal.

6. A camera according to claim 5, wherein said detection signal shows a predetermined value and said control means controls a shutter speed shifted from shutter speed calculated by said calculating means by amounts corresponding to the predetermined value which said detection signal shows.

7. A camera according to claim 5, wherein said metering optical system includes an interchangeable optical member, said camera further comprising means for detecting optical characteristics of said interchangeable optical member and for generating another detection signal and said control means controlling said shutter in accordance with said another detection signal.

8. A camera according to claim 5, wherein said control means controls said shutter at said shutter speed calculated by said calculating means when said detection signal is not produced.

9. A camera having means detecting an intensity of light from an object through a stop of a photographic lens to generate a light intensity signal, means for generating a film speed signal indicating a film speed and means for generating prior to exposure an aperture signal indicative of an aperture value which is to be controlled at the time of the exposure of said stop, comprising:
  (a) means for detecting that the aperture value represented by said aperture signal falls within a predetermined range and for generating a detection signal; and
  (b) control means for controlling an exposure value in accordance with said light intensity signal and said film speed signal, said control means controlling the exposure value to be a value different from the exposure value determined by said light intensity signal and said film speed signal, in accordance with said detection signal.

10. A camera according to claim 9, wherein said detection means does not generate said detection signal when an aperture value represented by said aperture signal is outside of said predetermined range, and said control means controls said stop so that the aperture value of said stop at the time of exposure is different from the aperture value represented by said aperture signal, when said detection signal produces, while said control means controls said stop so that the aperture value of said stop at the time of exposure is accordant with the aperture value represented by said aperture signal, when said detection signal does not generate.

11. A camera body which is detachably mounted on a photographic lens having a stop and on an optical member mountable on said photographic lens, respectively, said optical member being capable of being mounted between said photographic lens and said camera body and a combined optical characteristics of said optical member and said photographic lens being different from an optical characteristics of said lens, said camera body comprising:
  (a) means for generating a light intensity signal indicative of the light intensity from the object through at least said photographic lens;
  (b) means for generating a film speed signal indicative of a film speed;
  (c) means for generating an aperture signal indicative of an aperture value;
  (d) first detection means for detecting that said optical member is mounted on said camera body and for generating a first detection signal;
  (e) second detection means for detecting that the aperture value represented by said aperture signal falls within a predetermined range and for generating a second detection signal; and
  (f) control means for controlling an exposure value in accordance with said light intensity signal, said film speed signal and said first and second detection signals, said control means controlling the exposure value to be a value different from an exposure value determined by said light intensity signal and said film speed signal, in accordance with said second detection signal.

12. A camera body according to claim 11, wherein said aperture signal shows an aperture value which is to be controlled at the time of exposure.

13. A camera body according to claim 11, wherein said control means controls an exposure value to be a value substantially accordant with the exposure value determined by said light intensity signal and said film speed signal in response to said first detection signal in spite of said second detection signal being generated.

14. A camera body according to claim 11, wherein said second detection means does not generate said detection signal when an aperture value represented by said aperture signal is outside of said predetermined range, and said control means controls said stop so that the aperture value of said stop at the time of exposure is different from the aperture value represented by said aperture signal, when said detection signal produces, while said control means controls said stop so that the aperture value of said stop at the time of exposure is accordant with the aperture value represented by said aperture signal, when said detection signal does not generate.

* * * * *